(12) United States Patent
Chang et al.

(10) Patent No.: US 7,046,904 B2
(45) Date of Patent: May 16, 2006

(54) UV-CURABLE RESIN COMPOSITION FOR CLADDING OPTICAL FIBER

(75) Inventors: Selee Chang, Ansan-si (KR); Daesung Lee, Kunpo-si (KR); Junghyun Oh, Anyang-si (KR)

(73) Assignee: SSCP Co., Ltd., (KR)

( * ) Notice: Subject to any disclaimer, the term of this patent is extended or adjusted under 35 U.S.C. 154(b) by 0 days.

(21) Appl. No.: 10/527,372

(22) PCT Filed: Apr. 18, 2003

(86) PCT No.: PCT/KR03/00792

§ 371 (c)(1),
(2), (4) Date: Mar. 10, 2005

(87) PCT Pub. No.: WO2004/024814

PCT Pub. Date: Mar. 25, 2004

(65) Prior Publication Data

US 2006/0067638 A1    Mar. 30, 2006

(30) Foreign Application Priority Data

Sep. 10, 2002  (KR) ............... 10-2002-0054648

(51) Int. Cl.
*G02B 6/00* (2006.01)
(52) U.S. Cl. .............. 385/145; 385/143; 522/6; 522/109
(58) Field of Classification Search ........ 385/143, 385/145

See application file for complete search history.

(56) References Cited

U.S. PATENT DOCUMENTS

| 6,352,782 | B1 * | 3/2002 | Yeager et al. ............... 428/461 |
| 6,376,702 | B1 * | 4/2002 | Kai et al. ................... 560/190 |
| 6,410,611 | B1 * | 6/2002 | Sakurai et al. .............. 522/103 |

* cited by examiner

*Primary Examiner*—John D. Lee
*Assistant Examiner*—Rhonda S. Peace
(74) *Attorney, Agent, or Firm*—Anderson Kill & Olick, PC

(57) ABSTRACT

The present invention relates to a UV curable clad resin composition for optical fiber or waveguide comprising: (A) a photopolymerizable acrylate oligomer derived from the mixture composed of a polyol copolymer, an acid anhydride, an acrylate alcohol, a condensation polymerization catalyst and a polymerization inhibitor, (B) a photopolymerizable monomer, (C) a photopolymerization initiator, and (D) a leveling or antifoaming agent. The inventive composition minimizes optical loss and has a controllable low refractive index in the range of 1.35 to 1.46.

11 Claims, No Drawings

US 7,046,904 B2

UV-CURABLE RESIN COMPOSITION FOR CLADDING OPTICAL FIBER

FIELD OF THE INVENTION

The present invention relates to a UV-curable clad resin composition for optical fiber or waveguide, which exhibits a low optical loss as well as a low refractive index.

BACKGROUND OF THE INVENTION

Optical fibers composed of a core and a clad coated on the core are utilized as a light guide. A core having a high optical transmittance has been made of glass or plastic and the clad has been made of glass or resin having a refractive index lower than that of the core. Flexible plastic-clad optical fibers having a relatively thick core have been developed for indoor or short distance applications. Further, optical fibers having a two-layered clad have also been developed, the outer layer having a refractive index lower than that of the inner layer.

Various thermoplastic resin compositions have been used for optical fibers coatings, but the use of such thermoplastic resins requires a relatively long curing time at a high curing temperature, causing some thermal degradation of the fiber's optical property as well as poor productivity.

To solve such problems, U.S. Pat. No. 5,238,974 discloses a UV-curable cladding composition consisting essentially of a fluorinated monofunctional acrylate composition, a polyfunctional acrylate and a photoinitiator. U.S. Pat. Nos. 5,690,863 and 5,951,920 describe an optical fiber cladding composition comprising a highly fluorinated monofunctional (meth)acrylate monomer with a low refractive index of about 1.37. Further, EP 0 349 126 A2 discloses a cladding composed of an amorphous fluoroplastic resin having a high glass transition temperature. Though such UV curable acrylate-functional formulations have the advantage of fast curing, they are too viscous for die-coating applications. U.S. Pat. No. 5,822,489 provides a photocurable cladding material based on a fluorinated urethane acrylate. However, the fluorinated urethane acrylate oligomer absorbs light at about 1530 nm causing optical loss.

Accordingly, the present inventors have endeavored to develop a novel clad resin composition for optical fiber having improved properties and processability.

SUMMARY OF THE INVENTION

It is, therefore, an object of the present invention to provide a UV-curable resin composition for a clad layer of optical glass or plastic fiber or a waveguide which minimizes optical loss and has a controllable low refractive index in the range of 1.35 to 1.46.

In accordance with one aspect of the present invention, there is provided a clad resin composition for optical fiber or waveguide comprising (A) 40–95 parts by weight of a photopolymerizable acrylate derived from a mixture composed of 5–90% by weight of a polyol copolymer, 20–40% by weight of an acid anhydride, 5–50% by weight of a (meth)acrylate alcohol, 0.01–1% by weight of a condensation catalyst and 0.01–1% by weight of a polymerization inhibitor, (B) 5–60 parts by weight of a photopolymerizable monomer, (C) 0.5–20 parts by weight of a photopolymerization initiator and (D) 0.1–5 parts by weight of a leveling or antifoaming agent.

DETAILED DESCRIPTION OF THE INVENTION

The present invention provides a UV-curable resin composition for cladding of glass or plastic optical fibers or for a polymer waveguide comprising: (A) a photopolymerizable acrylate oligomer derived from a mixture composed of (i) a polyol copolymer, (ii) an acid anhydride, (iii) a (meth)acrylate alcohol, (iv) a condensation polymerization catalyst and (v) a polymerization inhibitor, (B) a photopolymerizable monomer, (C) a photopolymerization initiator and (D) a leveling or antifoaming agent.

(A) Photopolymerizable Acrylate Oligomer

The photopolymerizable acrylate oligomer(A) of the inventive composition is prepared using (i) a polyol copolymer, (ii) an acid anhydride, (iii) a (meth)acrylate alcohol, (iv) a condensation polymerization catalyst and (v) a polymerization inhibitor.

(i) Polyol Copolymer

A polyol copolymer which may be used in the preparation of the photopolymerizable acrylate oligomer(A) has a molecular weight in the range of from 50 to 10,000, preferably (a) a fluorinated polyol copolymer, (b) a polydimethylsiloxane (PDMS) polyol copolymer or (c) a hydrocarbon polyol copolymer.

(a) Fluorinated Polyol Copolymer

A fluorinated polyol copolymer comprises —$CF_2CF_2$— or —$CF_2CF_2O$— as a repeating unit. Representative examples of the fluorinated polyol copolymer may be 1H,1H,9H-hexadecafluorononanol, hexafluoro-2-methylisopropanol, 1,1,1,3,3,3-hexafluoro-2-propanol, hexafluoro-2-(p-tolyl)isopropanol, 4,5,5,6,6,6-hexafluoro-4-(trimethyl)-1-hexanol, 4,5,5,6,6,6-hexafluoro-4-(trifluoromethyl)-2-hexene-1-ol, 3,3,4,4,5,5,6,6-octafluoro-1,6-hexanediol, 1H,1H,5H-octafluoro-1-pentanol, 1H,1H-pentadecafluoro-1-octanol, 2,3,4,5,6-pentafluorobenzyl alcohol, pentafluorobutanol-2, 4,4,5,5,5-pentafluoropentanol, pentafluoropropionaldehyde hydrate or a mixture thereof. Commercially available examples are Z-dol (Ausimont USA, Inc.), Fluorink D10 (hereinafter, Ausimont Co., Italy), Fluorink T10, Fluorink E10, Fluorink F10, Zonyl TA-L (hereinafter, Dupont Co.) and Zonyl TA-N.

(b) PDMS Polyol Copolymer

A polydimethylsiloxane (PDMS) polyol copolymer comprises —$Si(CH_3)_2O$— as a repeating unit. Preferred examples of the PDMS polyol copolymer include 1,3-bis(hydrobuthyl)tetramethyldisiloxane, 1,4-bis(hydroprophryl)tetramethyldisiloxane, diphenylsilanediol and a mixture thereof. Commercially available examples are Hsi 2311 and Hsi 2111 (Tego Chem. Co.).

(c) Hydrocarbon Polyol Copolymer

A hydrocarbon polyol copolymer, which comprises —$CH_2CH_2O$— or —$CH_2CH(CH_2CH_3)O$— as a repeating unit, may be used to enhance a stress- and chemical-resistance and to control the viscosity.

Representative examples of the hydrocarbon polyol copolymer include polyester polyol, polyether polyol, polycarbonate polyol, polycaprolactone polyol and tetrahydrofurane propyleneoxide ring opening copolymer, and preferred is polyester polyol or tetrahydrofurane propyleneoxide ring opening copolymer.

Each polyol copolymer may be employed in accordance with the refractive index requirement of the resin composition. For example, a fluorinated polyol copolymer(a) may be used in preparing a resin composition having a refractive index in the range of 1.35–1.42, while when the refractive index requirement is 1.42–1.46, a PDMS polyol copolymer (b) may be used. A hydrocarbon polyol copolymer(c) may be further added for the purpose of controlling the viscosity.

Further, the hydrocarbon polyol copolymer may be used together with a mono or diol compound, the amount of the compound being preferably 5 to 30% by weight based on the amount of the hydrocarbon polyol copolymer. The mono- or diol compound is selected from the group consisting of ethylene glycol, propylene glycol, 1,4-butanediol, 1,5-pentanediol, 1,6-hexanediol, neopentyl glycol, 1,4-cyclohexane dimethanol, bisphenol-A, bisphenol-F and a mixture thereof. N—H bond in the urethane group formed by an ester reaction of organic acid and alcohol may reduce the absorption of light at a wavelength in the range of 1500–1600 nm, thereby minimizing an optical loss.

The polyol copolymer(i) is added in an amount of from 5 to 90 parts by weight based on the amount of the photopolymerizable acrylate oligomer(A), preferably from 50 to 80 parts by weight.

(ii) Acid Anhydride

An acid anhydride is added in an amount of from 10 to 45 parts by weight based on the amount of the photopolymerizable acrylate oligomer(A).

Representative examples of the acid anhydride include (+)-diacetyl-L-tartaric anhydride, (2-nonen-1-yl)succinic anhydride, acetic anhydride-$d_6$, 1,2,4-benzenetricarboxylic anhydride, (R)-(+)-2-acetoxysuccinic anhydride, (S)-(+)-2-acetoxysuccinic anhydride, (S)-(−)-1,2,3,4-tetrahydro-2,3-isoquinolinedicarboxylic anhydride, 1,2-cyclohexanedicarboxylic anhydride, 1,2-cyclohexanedicarboxylic anhydride, 1,3-cyclopentanedicarboxylic anhydride, 1-cyclopentane-1,2-dicarboxylic anhydride, 1-propanephosphonic acid cyclic anhydride, 2,2-dimethylsuccinic anhydride, 2,4,6,-trimethylbenzoic anhydride, 2,6-diphenyl-4-pyrininecarboxylic anhydride, 2-(1-octadecenyl)succinic anhydride, 2-ethylbutylic anhydride, 2-octadecylsuccinic anhydride, 2-bromo-5-norbornene-2,3-dicarboxylic anhydride, 2-ethyl-3-propylacrylic anhydride, 2,3,4,5,6-pentafluorobenzoic anhydride and a mixture thereof.

(iii) (Meth)acrylate Alcohol

A (meth)acrylate alcohol comprises at least one of (meth)acrylate and hydroxy group. Representative examples of the (meth)acrylate alcohol are selected from the group consisting of 2-hydroxyethyl(meth)acrylate, 2-hydroxypropyl(meth)acrylate, 2-hydroxybutyl(meth)acrylate, 2-hydroxyethylacrylate, 2-hydroxypropylacrylate, 2-hydroxy-3-phenyloxy-propyl(meth)acrylate, 4-hydroxybutylacrylate, neopentylglycomono(meth)acrylate, 4-hydroxycyclohexyl(meth)acrylate, 1,6-hexanediolmono(meth)acrylate, pentaerythritolpenta(meth)acrylate, dipentaerythritolpenta(meth)acrylate and a mixture thereof. The (meth)acrylate alcohol is added in an amount of from 5 to 50 parts by weight based on the amount of the photopolymerizable acrylate oligomer(A).

(iv) Condensation Polymerization Catalyst

A condensation polymerization catalyst is added in an amount of from 0.5 to 2.0 parts by weight based on the amount of the photopolymerizable acrylate oligomer(A) in the step of condensation polymerization. The condensation polymerization catalyst is preferably added in small divided portions so as to prevent optical loss caused by unreacted catalyst. Accordingly, a minimum amount of a catalyst must be used in the preparation of a photopolymerizable acrylate.

Representative examples of the catalyst are selected from the group consisting of triethylamine (TEA), dimethylaniline, N,N-dimethylaniline, dimethylphosphine, cobaltacetyl acetate, barium naphthate, calcium naphthate, cobalt naphthate, manganese naphthate and a mixture thereof. Commercially available examples include Fascat#4100 and Fascat#4200.

(v) Polymerization Inhibitor

A polymerization inhibitor is added in an amount of from 0.01 to 1 parts by weight based on the amount of the photopolymerizable acrylate oligomer(A).

Representative examples of the photopolymerization inhibitor include hydroquinone, hydroquinonemonomethylether, para-benzoquinone, phenotiazine and a mixture thereof.

The photopolymerizable acrylate oligomer(A) is added in an amount of from 40 to 95 parts by weight based on the amount of the clad resin composition of optical fibers of the present invention. When the amount of the oligomer(A) is less than 40 parts by weight, curing shrinkage of the clad resin composition may occur to cause optical loss, and also the viscosity of the resin composition becomes too low for dice-coating. When the amount of the oligomer(A) is more than 95 parts by weight, handling difficulties arise.

The photopolymerizable acrylate oligomer(A) may be prepared by a conventional method, the preferred embodiment is as follows:

A polyol copolymer(i) and optionally a diol compound, and a polymerization inhibitor(v) are added to a flask at a temperature ranging from 40 to 65° C. An acid anhydride(ii) and a condensation polymerization catalyst are added to the mixture with stirring, followed by heating. At this time, the temperature may be kept at 70 to 150° C.

The ring-opening reaction is carried out, until no IR peaks are observable at a wavelength range of 1700 to 1800 $cm^{-1}$, and the condensation reaction, until the acid value matches the value calculated when the reaction with the polyol is complete. Then, (meth)acrylate alcohol(iii) is added to the resulting products while maintaining the temperature in the range of from 70 to 150° C. The reaction is carried out until the acid value is zero, to obtain a photopolymerizable acrylate oligomer(A).

(B) Photopolymerizable Monomer

A photopolymerizable monomer used in the preparation of the composition has at least one (meth)acrylate group. The photopolymerizable monomer having a relatively low molecular weight is preferred for the purpose of controlling the viscosity.

According to the refractive index requirements of the inventive resin composition, a hydrocarbon or fluorinated photopolymerizable monomer may be used as a photopolymerizable monomer.

Representative examples of the hydrocarbon photopolymerizable monomer are selected from the group consisting of phenoxyethylacrylate, phenoxydiethyleneglycolacrylate, phenoxytetraethyleneglycolacrylate, phenoxyhexaethyleneglycolacrylate, isobornylacrylate (IBOA), isobornylmethacrylate, N-vinylpyrrolidone (N-VP), ethoxylated phenol monoacrylate, polyethylene glycol 200 diacrylate, tripropylene glycol diacrylate, trimethylopropane triacrylate (TMPTA), polyethyleneglycol diacrylate, ethyleneoxide added trimethylopropanetriacrylate (Eo-TMPTA), pentaerythritol tetraacrylate (PETA), 1,4-butandiol diacrylate, 1,6-hexandiol diacrylate, ethoxylated pentaerythritol tetraacrylate, 2-phenoxyethyl acrylate, ethoxylated bisphenol A diacrylate and a mixture thereof. Commercially available examples are Lightester FM-108 (Kongyoung Co.) and Lightester M-3F (Kongyoung Co.).

Representative examples of the fluorinated photopolymerizable monomer are selected from the group consisting of pentafluorobenzyl acrylate, 1H,1H-pentafluoropropyl (meth)acrylate2-(perfluorodecyl)ethyl acrylate, 3-(perfluorohexyl)-2-hydroxypropyl acrylate, 2-(perfluoro-3-methylbutyl)ethyl acrylate, 3-(perfluoro-3-methylbutyl)-2-hydroxypropyl methacrylate, 2-(perfluoro-9-methyldecyl) ethyl methacrylate, 3-(perfluoro-8-methyldecyl)-2-hydroxypropyl methacrylate, 2-(perfluoro-5-methylhexyl)-ethyl(meth)acrylate and a mixture thereof.

The photopolymerizable monomer is added in an amount of from 5 to 60 parts by weight based on the amount of the inventive clad resin composition. When the amount of the photopolymerizable monomer is less than 5 parts by weight, the resulting pre-polymer cures too slowly. When the amount of the photopolymerizable monomer is more than 60 parts by weight, the problem of optical loss caused by micro-bending between layers occurs due to an excessively low viscosity and high curing shrinkage.

(C) Photopolymerization Initiator

A photopolymerization initiator which may be employed in the preparation of the resin composition of the present invention preferably gives an optimum curing rate when the line velocity is maintained at 100 m/min or more during the drawing step. Preferred examples of the photopolymerization initiator are Irgacure#184 (hereinafter, CibaGeige Co.), Irgacure#907, Irgacure#500, Irgacure#651, CGI#1800, CGI#1700, Darocure#1173 (hereinafter, Merck Co.), Darocure#116 and a mixture thereof. The photopolymerization initiator is added in an amount of from 0.5 to 20 parts by weight based on the amount of the resin composition of the present invention.

(D) Leveling or Antifoaming Agent

A leveling or antifoaming agent which may be used for the purpose of imparting good surface slip characteristics to the resin, may be of a silicon or fluorine type. However, the fluorine type tends to foam which is difficult to suppress. Accordingly, a silicon type of agent is preferred.

The leveling or antifoaming agent is added in an amount of from 0.1 to 5 parts by weight based on the amount of the resin composition of the present invention.

Representative examples of the leveling or antifoaming agent may be BYK#371 (hereinafter, BYK-Chemie Co.), BYK#353, BYK#356, BYK#359, BYK#361, BYK#067, BYK#141, Tego Rad#2200 (hereinafter, Tego Chemie Co.), Tego Rad#2500, Tego Glide#410, Tego Glide#435, Tego Glide#453 and a mixture thereof.

Further, for the purpose of preventing the coated film from corroding, antioxidants may be employed in the preparation of the UV curable resin composition. The antioxidants include, for example, tetrakis[methylene(3,5-di-tert-butyl-4-hydroxyhydrocinnamate)]methane (Irg anox 1010, manufactured by Cibageigy Co., Ltd.), thiodiethylene bis(3,5-di-tert-butyl-4-hydroxyhydrocinnamate) (Irganox 1035), octadecyl 3,5-di-tert-butyl-4-hydroxyhydrocinnamate (Irganox1076) and a mixture thereof, which are preferably used in an amount of from 0.1 to 5 parts by weight based on the amount of the resin composition of the present invention.

The UV curable clad resin composition for optical glass or plastic fibers, or waveguide of the present invention may be prepared by a conventional method. A preferred embodiment of the process is as follows: a mixture of the ingredients (A) to (D) and an antioxidant is added to a polymerization reactor at a temperature ranging from 15 to 50° C. under a relative humidity of 60% or below and stirred at a uniform rate in the range of 500 to 1000 rpm, to prepare a UV-curable resin composition. If the temperature is less than 15° C., processing difficulties arise because the viscosity of the oligomer(A) becomes too high, and if the temperature is higher than 50° C., premature curing may occur.

The present invention is further described and illustrated in Examples provided below, which are, however, not intended to limit the scope of the present invention.

Preparation of Oligomers

Preparation 1

375 g of Z-dol (marketed by Ausimont USA, Inc.) and 72 g of hexa hydrogenated phthalic anhydride (H-HPA, DIXIE Co., USA) were mixed in a 1 L flask and heated to 85° C., followed by adding 3 g of triethylamine (TEA, Dongnamhapsung Co., Korea) in small portions. The ring-opening reaction of H-HPA and the ensuring esterification of H-HPA with the resulting alcohol were allowed to proceed until no IR peak was observable at 1700 to 1800 $cm^{-1}$. 1.2 g of hydroquinonemonomethylether (HQMME, Eastmann Co.) and 50 g of 2-hydroxyethylacrylate (2-HEA, Nippon Shokubai Co., Japan) were added thereto, and the mixture was allowed to react at about 85° C. until the acid value became zero, to obtain a photopolymerizable acrylate oligomer.

Comparative Preparation 1

The procedure of Preparation 1 was repeated except that 102.5 g of isophorone diisocyanate (IPDI) and 0.5 g of n-butyltin laurate (DBTL) were employed instead of H-HPA and TEA, respectively, to obtain a fluorinated urethane acrylate oligomer.

Preparations 2–4

The procedure of Preparation 1 was repeated using the ingredients shown in Table I, to obtain various photopolymerizable acrylate oligomers.

TABLE I

|  | Prep. 2 | | Prep. 3 | | Prep. 4 | |
| --- | --- | --- | --- | --- | --- | --- |
| (i) polyol copolymer | D10 | 332 g | T10 | 381 g | D10 | 372.1 g |
| (ii) acid anhydride | H-HPA | 98 g | H-HPA | 49 g | TMA* | 37.07 g |
| (iii) (meth) acrylate alcohol | 2-HEA | 68 g | 2-HEA | 68 g | 2-HEA | 86.33 g |
| (iv) condensation polymerization catalyst | TEA | 3 g | TEA | 3 g | TEA | 3 g |
| (v) polymerization inhibitor | HQMMA | 1.2 g | HQMMA | 1.2 g | HQMMA | 1.2 g |

*TMA: trimellitic anhydride

Preparation 5

347.15 g of D10 and 79.12 g of phthalic anhydride were mixed in a 1 L flask and heated to 70° C., followed by adding 3 g of triethylamine (TEA) in small portions. The ring-opening reaction of H-HPA and the ensuring esterification of H-HPA with the resulting alcohol were allowed to proceed until no IR peak was observable at 1700 to 1800 $cm^{-1}$. 1.2 g of hydroquinonemonomethylether (HQMME) and 86.33 g of 2-hydroxyethylacrylate (2-HEA) were added thereto, and the mixture was allowed to proceed at 85° C. until the acid value became zero, to obtain a photopolymerizable acrylate oligomer.

Preparations 6–9

The procedure of Preparation 5 was repeated using the ingredients shown in Table II, to obtain various photopolymerizable acrylate oligomers.

TABLE II

|  | Prep. 6 | | Prep. 7 | | Prep. 8 | | Prep. 9 | |
| --- | --- | --- | --- | --- | --- | --- | --- | --- |
| (i) | D10 | 366.02 g | His 2111 polyTHF | 242.6 g 75.09 g | D10 polyTHF | 288.00 g 61.71 g | D10 polyTHF | 300.0 g 43.00 g |
| (ii) | MA* | 56.36 g | MA | 77.08 g | MA | 63.35 g | SA** | 66.35 g |
| (iii) | 2-HEA | 75.12 g | 2-HEA | 102.74 g | 2-HEA | 84.44 g | 2-HEA | 88.08 g |
| (iv) | TEA | 3 g | TEA | 3 g | TEA | 3 g | TEA | 3 g |
| (v) | HQMMA | 1.2 g | HQMMA | 1.2 g | HQMMA | 1.2 g | HQMMA | 1.2 g |

*MA: maleic anhydride
**SA: succinic anhydride

Each of the oligomers obtained in Preparations 1 to 9 was washed with a mixture of 10% HCl and 10% $H_2SO_4$.

Preparation of Resin Composition

EXAMPLE 1

86 parts by weight of the oligomer obtained in Preparation 1, 10 parts by weight of Light Ester FM-108 (Kongyoung Co., Korea), 2.5 parts by weight of Irgacure#184 (Cibageige Co.), 0.5 parts by weight of Byk 375 (manufactured by BYK-Chemie Co.) and 1 part by weight of Irganox 1010 (manufactured by Cibageige Co.) were added to a reactor and stirred at about 25° C. to obtain a photopolymerizable clad resin composition for optical fiber or waveguide.

COMPARATIVE EXAMPLE 1

The procedure of Example 1 was repeated except that a urethane oligomer obtained in Comparative Preparation 1 was employed instead of the oligomer obtained in Preparation 1, to obtain a fluorinated urethane clad composition.

EXAMPLES 2–9

The procedure of Example 1 was repeated except that the oligomers obtained in Preparations 2 to 9 were each employed instead of the oligomer obtained in Preparation 1, to obtain eight photopolymerizable clad resin compositions.

EXAMPLE 10

The procedure of Example 1 was repeated except that Light Ester HDDA (Kongyoung Co., Korea) was used instead of Light Ester FM-108 as a photopolymerizable monomer(B), to obtain a photopolymerizable clad resin composition.

EXAMPLES 11–18

The procedure of Examples 2 to 9 was repeated except that Light Ester HDDA was used instead of Light Ester FM-108 as a photopolymerizable monomer(B), to obtain a UV curable clad resin composition.

Physical Characteristics

The physical and optical properties of the UV curable resin compositions prepared in Examples 1–18 were measured by the methods described below, and the results are shown in Table III:

(1) Inherent viscosity: Brookfield viscometer (No. 41 spindle) at 25° C.;

(2) The intensity of radiation on curing: measuring the intensity of UV radiation at which a formulation starts to be cured with BYK Gardener;

(3) Refractive index (uncured resin composition): Abbe Refractometer with sodium d-line (wavelength 589.3 μm) at 25° C.;

(4) Optical loss (dB/cm) at 1550 nm;

(5) N.A. (numerical aperture)$_{cal}$=[refractive index of the core ($n_{core}$)–refractive index of the clad ($n_{clad}$)]$^{1/2}$;

(6) Optical transmittance (film, % T): Measuring at 850~1100 nm with a UV-VIS-NIR spectrophotometer (Sinco Co.).

TABLE III

| Example | Viscosity (25° C., cPs) | Optical Amount (mJ/cm$^2$) | Refractive index (25° C.) | Optical loss (dB/cm) | N.A. (cal.) | Optical Trans. (%) |
| --- | --- | --- | --- | --- | --- | --- |
| 1 | 2500 | 400 | 1.370 | 0.13 | 0.505 | >90% |
| 2 | 2200 | 400 | 1.380 | 0.155 | 0.447 | >90% |
| 3 | 3000 | 400 | 1.390 | 0.11 | 0.447 | >90% |
| 4 | 2800 | 300 | 1.400 | 0.12 | 0.414 | >90% |
| 5 | 2600 | 400 | 1.405 | 0.14 | 0.397 | >90% |
| 6 | 2750 | 400 | 1.405 | 0.145 | 0.397 | >90% |
| 7 | 1500 | 500 | 1.430 | 0.18 | 0.294 | <65% |
| 8 | 3300 | 250 | 1.410 | 0.09 | 0.379 | >80% |
| 9 | 3150 | 250 | 1.415 | 0.10 | 0.360 | >80% |
| 10 | 2200 | 350 | 1.375 | — | 0.491 | >90% |
| 11 | 1800 | 350 | 1.390 | — | 0.447 | >90% |
| 12 | 2700 | 350 | 1.405 | — | 0.397 | >90% |
| 13 | 2500 | 300 | 1.410 | — | 0.379 | >90% |
| 14 | 2450 | 350 | 1.415 | — | 0.360 | >90% |
| 15 | 2350 | 350 | 1.415 | — | 0.360 | >90% |
| 16 | 1200 | 450 | 1.440 | — | 0.215 | <95% |
| 17 | 2950 | 200 | 1.420 | — | 0.340 | >80% |
| 18 | 3700 | 200 | 1.425 | — | 0.318 | >80% |
| Comp. Ex 1 | 4500 | 350 | 1.400 | 0.23 | 0.414 | >90% |

As can be seen from the above results, the UV curable clad resin composition for optical fiber or waveguide comprising a photopolymerizable acrylate oligomer in accordance with the present invention has a refractive index in the range of 1.35 to 1.46 and exhibits lower optical loss than the urethane acrylate oligomer based composition. Further, the refractive index of the inventive resin composition can be controlled by adjusting the amount of the acrylate oligomer. The acrylate oligomer prepared by introducing acrylate groups at both ends has enhanced light absorption at a wavelength in the range of 1500–1600 nm. Further, the present resin composition has a high optical transmittance of from 80 to 95% at a wavelength ranging from 850 to 1100 nm, showing that the inventive composition is characterized by low optical loss in addition to the desirable viscosity property which makes it possible to draw the resin composition at about 25° C.

While the subject invention have been described and illustrated with respect to the preferred embodiments only, various changes and modifications may be made therein without departing from the essential concept of the present invention which should be limited only by the scope of the appended claims.

What is claimed is:

1. A clad resin composition for optical fiber or waveguide comprising: (A) 40–95 parts by weight of a photopolymerizable acrylate derived from a mixture composed of 5–90% by weight of a polyol copolymer, 20–40% by weight of an acid anhydride, 5–50% by weight of a (meth)acrylate alcohol, 0.01–1% by weight of a condensation catalyst and 0.01–1% by weight of a polymerization inhibitor, (B) 5–60 parts by weight of a photopolymerizable monomer; (C) 0.5–20 parts by weight of a photopolymerization initiator and (D) 0.1–5 parts by weight of a leveling or antifoaming agent.

2. The composition of claim 1, wherein the polyol copolymer(i) has an average molecular weight ranging from 50 to 10000, and comprises as a repeating unit (a) fluorinated polyol copolymer having —$CF_2CF_2$— or —$CF_2CF_2O$—, (b) polydimethylsiloxane (PDMS) polyol copolymer having —$Si(CH_3)_2O$— or (c) hydrocarbon polyol copolymer having —$CH_2CH_2O$— or —$CH_2CH(CH_2CH_3)O$—.

3. The composition of claim 2, wherein the fluorinated polyol copolymer is selected from the group consisting of 1H,1H,9H-hexadecafluorononanol, hexafluoro-2-methyl-isopropanol, 1,1,1,3,3,3-hexafluoro-2-propanol, hexafluoro-2-(p-tolyl)isopropanol, 4,5,5,6,6,6-hexafluoro-4-(trimethyl)-1-hexanol, 4,5,5,6,6,6-hexafluoro-4-(trifluoromethyl)-2-hexene-1-ol, 3,3,4,4,5,5,6,6-octafluoro-1,6-hexanediol, 1H,1H,5H-octafluoro-1-pentanol, 1H,1H-pentadecafluoro-1-octanol, 2,3,4,5,6-pentafluorobenzyl alcohol, pentafluorobutanol-2, 4,4,5,5,5-pentafluoropentanol, pentafluoropropionaldehyde hydrate and a mixture thereof.

4. The composition of claim 2, wherein the polydimethylsiloxane polyol copolymer is selected from the group consisting of 1,3-bis(hydrobuthyl)tetramethyldisiloxane, 1,4-bis(hydroprophryl)tetramethyldisiloxane, diphenylsilanediol and a mixture thereof.

5. The composition of claim 2, wherein the hydrocarbon polyol copolymer is selected from the group consisting of polyester polyol, polyether polyol, polycarbonate polyol, polycaprolactone polyol and tetrahydrofurane propyleneoxide ring opening copolymer.

6. The composition of claim 1, wherein the acid anhydride (ii) is selected from the group consisting of (+)-diacetyl-L-tartaric anhydride, (2-nonen-1-yl)succinic anhydride, acetic anhydride-$d_6$, 1,2,4-benzenetricarboxylic anhydride, (R)-(+)-2-acetoxysuccinic anhydride, (S)-(+)-2-acetoxysuccinic anhydride, (S)-(−)-1,2,3,4-tetrahydro-2,3-isoquinolinedicarboxylic anhydride, 1,2-cyclohexanedicarboxylic anhydride, 1,2-cyclohexanedicarboxylic anhydride, 1,3-cyclopentanedicarboxylic anhydride, 1-cyclopentane-1,2-dicarboxylic anhydride, 1-propanephosphonic acid cyclic anhydride, 2,2-dimethylsuccinic anhydride, 2,4,6-trimethylbenzoic anhydride, 2,6-diphenyl-4-pyrininecarboxylic anhydride, 2-(1-octadecenyl)succinic anhydride, 2-ethylbutylic anhydride, 2-octadecylsuccinic anhydride, 2-bromo-5-norbornene-2,3-dicarboxylic anhydride, 2-ethyl-3-propylacrylic anhydride, 2,3,4,5,6-pentafluorobenzoic anhydride and a mixture thereof.

7. The composition of claim 1, wherein the (meth)acrylate alcohol(iii) is selected from the group consisting of 2-hydroxyethyl(meth)acrylate, 2-hydroxypropyl(meth)acrylate, 2-hydroxybutyl(meth)acrylate, 2-hydroxyethylacrylate, 2-hydroxypropylacrylate, 2-hydroxy-3-phenyloxypropyl (meth)acrylate, 4-hydroxybutylacrylate, neopentylglycomono(meth)acrylate, 4-hydroxycyclohexyl(meth)acrylate, 1,6-hexanediolmono(meth)acrylate, pentaerythritolpenta(meth)acrylate, dipentaerythritolpenta (meth)acrylate and a mixture thereof.

8. The composition of claim 1, wherein the condensation polymerization catalyst is selected from the group consisting of triethylamine (TEA), dimethylaniline, N,N-dimethylaniline, dimethylphosphine, cobaltacetyl acetate, barium naphthate, calcium naphthate, cobalt naphthate, manganese naphthate and a mixture thereof.

9. The composition of claim 1, wherein the polymerization inhibitor is selected from the group consisting of hydroquinone, hydroquinonemonomethylether, para-benzoquinone, phenotiazine and a mixture thereof.

10. The composition of claim 1, wherein the photopolymerizable monomer(B) includes a fluorinated and hydrocarbon monomer, and said fluorinated monomer is selected from the group consisting of pentafluorobenzyl acrylate, 1H,1H-pentafluoropropyl(meth)acrylate2-(perfluorodecyl) ethyl acrylate, 3-(perfluorohexyl)-2-hydroxypropyl acrylate, 2-(perfluoro-3-methylbutyl)ethyl acrylate, 3-(perfluoro-3-methylbutyl)-2-hydroxypropyl methacrylate, 2-(perfluoro-9-methyldecyl)ethyl methacrylate, 3-(perfluoro-8-methyldecyl)-2-hydroxypropyl methacrylate, 2-(perfluoro-5-methylhexyl)ethyl(meth)acrylate and a mixture thereof and the hydrocarbon monomer is selected from the group consisting of phenoxyethylacrylate, phenoxydiethyleneglycolacrylate, phenoxytetraethyleneglycolacrylate, phenoxyhexaethyleneglycolacrylate, isobornylacrylate (IBOA), isobornylmethacrylate, N-vinylpyrrolidone (N-VP), ethoxylated phenol monoacrylate, polyethylene glycol 200 diacrylate, tripropylene glycol diacrylate, trimethylopropane triacrylate (TMPTA), polyethyleneglycol diacrylate, ethyleneoxide added trimethylopropanetriacrylate (Eo-TMPTA), pentaerythritol tetraacrylate (PETA), 1,4-butandiol diacrylate, 1,6-hexandiol diacrylate, ethoxylated pentaerythritol tetraacrylate, 2-phenoxyethyl acrylate, ethoxylated bisphenol A diacrylate and a mixture thereof.

11. The composition of claim 1 further comprising antioxidants in an amount of from 0.1 to 5 parts by weight.

* * * * *